United States Patent [19]

Moehle et al.

[11] Patent Number: 5,209,979
[45] Date of Patent: May 11, 1993

[54] SILICON CARBIDE COATED ARTICLE WITH CERAMIC TOPCOAT

[75] Inventors: William E. Moehle, Baton Rouge, La.; Leonard M. Niebylski, Birmingham, Mich.

[73] Assignee: Ethyl Corporation, Richmond, Va.

[21] Appl. No.: 466,215

[22] Filed: Jan. 17, 1990

[51] Int. Cl.$^5$ .............................................. B32B 9/04
[52] U.S. Cl. .................................. 428/408; 428/446; 501/90; 501/96
[58] Field of Search ................. 428/552, 446; 501/88, 501/96, 97, 90

[56] References Cited

U.S. PATENT DOCUMENTS

| | | | |
|---|---|---|---|
| 4,482,699 | 11/1984 | Seyferth et al. | 528/37 X |
| 4,581,468 | 3/1986 | Paciorek et al. | 501/96 |
| 4,910,173 | 3/1990 | Niebylski | 501/88 X |
| 4,921,925 | 5/1990 | Niebylski | 528/5 |

*Primary Examiner*—Peter A. Nelson
*Attorney, Agent, or Firm*—Patricia J. Hogan

[57] ABSTRACT

Silicon carbide-coated carbonaceous substrates are overcoated with one or more ceramic layers derived from an organoborosilazane polymer solution containing 0-60% by weight of dispersed ceramic or preceramic powdered solids to seal the silicon carbide coating and provide better resistance to oxidative deterioration at elevated temperatures; the organoborosilazane polymer being the product obtained by reacting about 0.25-20 parts by weight of a trialkoxy-, triaryloxy-, or tri(arylalkoxy)boroxine with one part by weight of a polysilazane in an organic solvent. The thus-coated substrates are optionally overcoated with a buffer layer and then with one or more ceramic layers derived from polysilazane solutions or dispersions.

7 Claims, No Drawings

SILICON CARBIDE COATED ARTICLE WITH CERAMIC TOPCOAT

FIELD OF THE INVENTION

This invention relates to silicon carbide-coated carbonaceous articles and more particularly to such articles which are overcoated with a sealant.

BACKGROUND

It is known that many carbonaceous materials, such as carbon/carbon composites, carbon fibers, and graphite, have properties which make them attractive for use in aerospace and other applications in which their susceptibility to oxidative deterioration at elevated temperatures is a serious disadvantage.

It is also known that these carbonaceous materials can be protected from oxidative deterioration by providing them with silicon carbide coatings, which are normally deposited on the carbonaceous substrates by techniques such as chemical vapor deposition (CVD), plasma-enhanced CVD (PECVD), packed cementation, or diffusion bonding.

A disadvantage of the known silicon carbide-coated carbonaceous substrates is that the coatings are subject to cracking and, when cracked, lose their ability to provide adequate protection to the substrates.

Copending applications Ser. No. 242,493 (Niebylski), filed Sep. 9, 1988, and Ser. No. 272,481 (Niebylski), filed Nov. 17, 1988, teach that carbonaceous substrates can be protected from oxidative deterioration by the application, drying, and pyrolysis of solutions of organoborosilazane polymers obtained by reacting about 0.25-20 parts by weight of a trialkoxy-, triaryloxy-, or tri(arylalkoxy)boroxine with one part by weight of a polysilazane in an organic solvent.

Copending applications Ser. No. 261,104 (Niebylski), filed Oct. 24, 1988, and Ser. No. 414,262 (Niebylski), Ser. No. 414,464 (Niebylski), and Ser. No. 414,768 (Niebylski), all filed Sep. 29, 1989, teach that the organoborosilazane polymer solutions used to prepare these protective coatings can have ceramic or preceramic powdered solids dispersed therein.

Copending application Ser. No. 301,449 (Niebylski), filed Jan. 25, 1989, teaches that outstanding protection from oxidative deterioration at elevated temperatures can be obtained by the use of ceramic coatings having at least one layer derived from a polysilazane-containing composition and at least one layer derived from an organoborosilazane polymer-containing composition. However, it has been found that a disadvantage of at least some of these multi-layer coatings is that cracking is apt to occur when ceramic layers derived from polysilazane-containing compositions are applied over ceramic layers derived from organoborosilazane polymer-containing compositions.

Copending applications Ser. No. 446,184 (Niebylski), filed Dec. 5, 1989, and Ser. No. 466,225 (Niebylski et al.), filed Jan. 17, 1990, teach that this cracking can be minimized by the use of a buffer layer derived from either (1) a solution of (A) a Group IIIb metal hydrocarbyloxide, (B) a Group IVa metal hydrocarbyloxide, (C) a bis-, tris-, or tetrakis(dialkylamino)metal of Group IVa, (D) a polysilazane and/or a bis-, tris-, or tetrakis(dialkylamino)silane, and (E) optionally also a cyclopentadienyl Group IVa metal halide in an organic solvent or (2) a dispersion of ceramic or preceramic powdered solids in such a solution.

THE INVENTION

It has now been found that silicon carbide-coated carbonaceous substrates can be sealed to increase their resistance to oxidative deterioration by overcoating them with a ceramic derived from a composition comprising an organoborosilazane polymer which is the product obtained by reacting about 0.25-20 parts by weight of a trialkoxy-, triaryloxy-, or tri(arylalkoxy)boroxine with one part by weight of a polysilazane in an organic solvent.

The silicon-carbide coated carbonaceous substrate which is overcoated in the practice of the invention may be any of the known silicon carbide-coated carbonaceous materials, such as those mentioned above. However, in a preferred embodiment of the invention, it is one in which the substrate is a carbon-carbon composite, and the coating is a coating which consists essentially of silicon carbide or siliconized silicon carbide (i.e., a mixture of silicon carbide and silicon) and which is deposited on the substrate by CVD, PECVD, packed cementation, or diffusion bonding of suitable sources of silicon and carbon, such as an alkylsilane or a mixture of an alkane of 1-6 carbons and a silane, alkylsilane, halosilane, halodisilane, halopolysilane, or mixtures thereof.

The organoborosilazane polymers employed in the practice of the invention are disclosed in the aforementioned Niebylski applications.

As taught in those copending applications, the polysilazane which is reacted with the boroxine may be any polysilazane that is soluble in common organic solvents, such as aliphatic or aromatic hydrocarbons, dialkyl or alicyclic ethers, etc.; and it may be, e.g., a polysilazane of any of U.S. Pat. Nos. 4,397,828 (Seyferth et al.-I), 4,482,669 (Seyferth et al.-II), 4,645,807 (Seyferth et al.-III), 4,650,837 (Seyferth et al.-IV), and 4,659,850 (Arai et al.), the teachings of all of which are incorporated herein in toto by reference. However, it is preferably a polysilazane of the type taught by Seyferth et al.-II, i.e., a polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent, a mixture of such polysilazanes, or, alternatively, an oligomeric ammonolysis product formed as an intermediate in the process of Seyferth et al.-II and isolated as in Seyferth et al.-I. For example, it may be one or more polysilazanes prepared by reacting methyldichlorosilane with ammonia, treating the ammonolysis product with potassium hydride, and quenching the resultant product with methyl iodide or dimethylchlorosilane; or it may be one or more polysilazanes prepared by reacting methyldichlorosilane with ammonia and isolating the ammonolysis product.

The boroxine reactant is generally a compound corresponding to the formula:

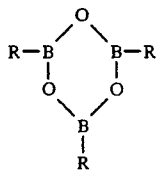

wherein R is an alkoxy, aryloxy, or arylalkoxy group, preferably an alkoxy, phenoxy, alkylphenoxy, phenalkoxy, or alkylphenalkoxy group in which any alkyl or alkoxy group contains 1-6 carbons, such as the trimethoxy-, triethoxy-, tripropoxy-, tributoxy-, tripentoxy-, trihexoxy-, triphenoxy-, tritolyloxy-, tri(2-ethylphenoxy)-, tribenzyloxy-, triphenethoxy-, tri(3-phenylpropoxy)-, tri(4-phenylbutoxy)-, tri(5-phenylpentoxy)-, and tri(6-phenylhexoxy)boroxines, the corresponding triphenalkoxyboroxines having non-linear alkyl chains, tritolylethoxyboroxine, etc. It is preferably trimethoxyboroxine or triphenoxyboroxine.

Regardless of the particular boroxine used, the amount employed is about 0.25-20 parts per part by weight of the polysilazane. However, when the boroxine is a trialkoxyboroxine, it is generally preferred to use about 1-6, most preferably about 3-4 parts per part by weight of polysilazane; and, when the boroxine is a triaryloxyboroxine, it is generally preferred to employ about 1-10, most preferably about 6-8 parts per part by weight of polysilazane.

To prepare the organoborosilazane polymers, the neat boroxine reactant (if sufficiently low melting) or a solution thereof in an organic solvent is added to a neat polysilazane (if a liquid) or to a solution of a polysilazane in an organic solvent to initiate an exothermic reaction which is preferably controlled to a temperature below 50° C. for a period of time sufficient to allow the formation of an organoborosilazane polymer. In a preferred embodiment of the invention, the polysilazane is used as a clear solution having a solids content of about 10-40%, preferably about 30% by weight; and the total amount of solvent employed is such as to provide an organoborosilazane polymer solids content of about 5-75%, preferably about 30-60% by weight.

The solvent employed for the boroxine and/or polysilazane may be any suitable organic solvent, such as hexane, heptane, and other aliphatic hydrocarbons; benzene, toluene, xylene, and other aromatic hydrocarbons; cyclohexanone, 1-methyl-2-pyrrolidone, and other ketones; 1,2-dimethoxyethane, 2-methoxyethyl ether, and other ethers; etc.; and mixtures thereof. When it is desired to use a mixture of solvents for the reaction, the desired mixture may be introduced as the solvent for the polysilazane or for both the polysilazane and the boroxine, or different solvents may be used for the polysilazane and the boroxine.

The organoborosilazane polymer solutions prepared by this process may be used per se as the coating compositions of the present invention, or they may have up to about 60% by weight of ceramic or preceramic powders dispersed therein. The preceramic powders that can be used include both those which undergo reaction to provide ceramics and those which undergo reaction to provide glasses. Exemplary of the ceramic and preceramic powders are silicon metal; aluminum-silicon eutectic; silicon carbide; silicon nitride; metal borides, such as the borides of silicon, hafnium, titanium, niobium, zirconium, the rare earths, etc.; and mixtures thereof. When employed, the powders are preferably employed in amounts such as to constitute about 15-35% by weight of the dispersions.

The organoborosilazane polymer compositions which are applied to the silicon carbide-coated substrates may be applied directly thereto or to a surface thereof which has been primed to improve adherence of the ceramic coating. A particularly useful primer composition for use in this regard is a composition comprising (A) about 99-95 parts by weight of a trialkoxy-, triaryloxy-, or tri(arylalkoxy)boroxine, such as those mentioned above, (B) respectively about 1-5 parts by weight of an anhydrous acid selected from HF and $HNO_3$, (C) a non-aqueous vehicle for the acid, and (D) optionally a solvent for the boroxine.

The anhydrous acid, which is included in the primer to etch the surface of the substrate and thus improve adhesion of the coating, is preferably HF and is incorporated into the composition in any suitable non-aqueous vehicle, such as methanol, ethanol, isopropanol, pyridine, or other solvent. Because of their commercial availability, anhydrous HF-ethanol and HF-pyridine are apt to be preferred sources of the acid and vehicle.

When the boroxine is sufficiently low-melting, it is not necessary for the composition to contain a solvent for the boroxine. However, when the boroxine is too high-melting to be easily applied, and optionally even when the boroxine is low-melting, the composition usually contains a solvent for the boroxine, e.g., an aliphatic hydrocarbon, such as hexane, heptane, etc.; an aromatic hydrocarbon, such as benzene, toluene, xylene, etc.; a non-hydrocarbon solvent, such as methanol, ethanol, cyclohexanone, 1-methylpyrrolidone, etc.; other solvents having boiling points not higher than about 250° C.; and mixtures of such solvents.

The primer composition may be applied to the silicon carbide-coated substrate in any suitable manner, such as by dipping, spraying, swabbing, or brushing, to form a coating having the desired thickness, generally a thickness of about 0.5-15 micrometers. When the desired thickness has been deposited, the coating can then be solidified and adhered to the substrate by heating it at about 100°-250° C.

The organoborosilazane coating compositions may be applied to the optionally primed silicon carbide-coated substrates in any suitable manner, such as by spraying, swabbing, or brushing, to form coatings having the desired thickness, generally a thickness of up to about 1000 micrometers, frequently a thickness of about 10-250 micrometers. A coating of a desired thickness can be achieved by applying a single coating of that thickness or by applying the precursor polymer coating composition in multiple thinner layers, e.g., by applying the coating composition in layers of about 25-100 micrometers, each layer being dried by driving off the solvent before the next layer is applied.

When temperatures as high as about 200°-250° C. are used to drive off high boiling solvents, some crosslinking of the preceramic polymer is initiated during the drying of the coating composition. However, higher temperatures, i.e., about 675°-900° C., preferably about 825°-875° C., are required to convert the preceramic coating to a ceramic coating. This pyrolysis may be delayed until the final desired thickness of preceramic coating has been deposited. However, it is generally preferred to pyrolyze each one or two layers of dried preceramic coating before applying the next layer of coating composition. The time required for the pyrolysis is generally about 1-60 minutes, depending on the particular pyrolysis temperature selected. In the preferred embodiment of the invention where the coating is applied in multiple layers, each one or two of which is pyrolyzed before the application of the next layer, and the pyrolysis temperature is about 825°-875° C., it is generally preferred to pyrolyze the first coat for only about five minutes and then to pyrolyze subsequent coats for longer times up to about 15 minutes.

When the coating contains dispersed solids, each pyrolysis is followed by thermal treatment of the coated substrate at about 1075°-1250° C., preferably about 1100°-1175° C., most preferably about 1125° C., in an atmosphere containing not more than a minor amount of oxygen, e.g., in a nitrogen, argon, or helium atmosphere, to convert the ceramic coating into a more homogeneous coat. This treatment may be accomplished by raising the temperature in the vessel used for the pyrolysis or by transferring the coated substrate to a vessel maintained at the higher temperature; and it is preferably continued for about five minutes for the first coat and longer periods, e.g., about 15-20 minutes, for subsequent coats.

After each pyrolysis or pyrolysis/heat treatment step employed in providing a ceramic coating, the coated substrate is cooled. Optimum results are attained when this cooling is accomplished at a rate not greater than about 50° C./minute, preferably about 20°-30° C./minute, until the substrate temperature is below 500° C., at which time further cooling may be accomplished at ambient air temperature. However, faster cooling rates may be used if desired.

Although not essential, it is preferred to keep the starting polysilazane and the organoborosilazane polymers and compositions formed from it in a dry atmosphere until a layer of ceramic has been formed because of the susceptibility of the preceramic materials to attack by water and other compounds having active hydrogens.

The ceramic coating derived from the organoborosilazane polymer solution or dispersion may constitute the sole coating over the silicon carbide-coated substrate, or it may be overcoated to provide still greater protection to the substrate. For example, in a preferred embodiment of the invention, an optionally primed silicon carbide-coated carbonaceous substrate which has been provided with at least one ceramic coating layer derived by (1) coating it with a solution of 5-75% by weight of an organoborosilazane polymer in 95-25% by weight of an organic solvent and (2) drying and pyrolyzing the organoborosilazane polymer coating in accordance with the present invention is then overcoated by:

(A) providing it with at least one ceramic overcoat derived by (1) overcoating it with a dispersion of about 0-1.0 part by weight of a Group IIa metal salt and about 0.1-5.0 parts by weight of ceramic or preceramic powdered solids in a solution of about 1.25-20 parts by weight of an organoborosilazane polymer in about 0.5-400 parts by weight of an organic solvent and (2) drying and pyrolyzing the coating, (B) providing the thus-coated substrate with at least one ceramic overcoat derived by (1) overcoating it with a buffer composition which is a dispersion of about 1-35% by weight of ceramic or preceramic powdered solids in a solution of (a) a Group IIIb metal hydrocarbyloxide, (b) a Group IVa metal hydrocarbyloxide, (c) a bis-, tris-, or tetrakis(dialkylamino)metal of Group IVa, (d) a polysilazane and/or a bis-, tris-, or tetrakis(dialkylamino)silane, and (e) optionally a cyclopentadienyl Group IVa metal halide in an organic solvent; each of ingredients a-d constituting 1-50% of their combined weights, and ingredient e constituting 0-20% of the combined weights of ingredients a-e, (2) overcoating the buffer composition with a solution of 5-75% by weight of a polysilazane in 95-25% by weight of an organic solvent, and (3) drying and pyrolyzing the buffer and polysilazane compositions separately or simultaneously, and (C) providing the thus-coated substrate with at least one ceramic overcoat derived by (1) overcoating it with a dispersion of about 0.1-5.0 parts by weight of ceramic or preceramic powdered solids in a solution of one part by weight of a polysilazane in about 1.3-20 parts by weight of an organic solvent and (2) drying and pyrolyzing the coating.

In other preferred embodiments of the invention, the coated substrate provided by the process just described is overcoated with (A) a layer obtained by applying, drying, and optionally pyrolyzing a thin coat of the aforementioned buffer composition and/or (B) one or more ceramic layers derived by applying, drying, and pyrolyzing a solution of 5-75% by weight of a polysilazane in 95-25% by weight of an organic solvent.

In these preferred embodiments, the utilizable polysilazane, ceramic or preceramic powdered solids, and organic solvents can be any of those mentioned above; and the Group IIa metal salts which can be used include, e.g., the fluorides, tetrafluoroborates, oxides, oxyfluorides, oxynitrides, acetates, and benzoates of beryllium, magnesium, calcium, strontium, and barium, with the preferred salt being barium fluoride.

In the buffer composition employed in the preferred embodiments:

(A) The Group IIIb and Group IVa metal hydrocarbyloxides utilized in the buffer composition may be any such compounds which can be dissolved in the organic solvent. Exemplary of such compounds are the aryloxides, such as the phenoxides; and the alkoxides, especially those in which the alkoxy groups contain 1-6 carbons, such as the methoxides, ethoxides, n- and iso-propoxides, n-, sec-, and t-butoxides, pentoxides, and hexoxides, of boron, aluminum, gallium, indium, thallium, titanium, zirconium, and hafnium. The preferred Group IIIb metal hydrocarbyloxide is aluminum sec-butoxide, and the preferred Group IVa metal hydrocarbyloxide is zirconium propoxide. As indicated above, the amounts of Group IIIa metal hydrocarbyloxide and Group IVa metal hydrocarbyloxide used may vary widely. However, the preferred amount of each of these ingredients is about 20-30% of the combined weights of ingredients A-E.

(B) The bis-, tris-, or tetrakis(dialkylamino)metal is a compound of a Group IVa metal, i.e., titanium, zirconium, or hafnium, in which the alkyl groups contain 1-6 carbons. Exemplary of such compounds are tetrakis(dimethylamino)titanium, tetrakis(diethylamino)titanium, tetrakis(dipropylamino)titanium, tetrakis(dibutylamino)titanium, tetrakis(dipentylamino)titanium, tetrakis(dihexylamino)titanium, the corresponding tris(dialkylamino)titanium hydrides, the corresponding bis(dialkylamino)titanium dihydrides, the corresponding zirconium and hafnium compounds, and mixtures thereof. The preferred compound is tetrakis(diethylamino)titanium, and the amount used is preferably about 1-15% of the combined weights of ingredients A-E.

(C) The bis-, tris-, or tetrakis(dialkylamino)silane which is used instead of or together with the polysilazane is a compound in which the alkyl groups contain 1-6 carbons. Exemplary of such compounds are tetrakis(diethylamino)silane, tetrakis(dipropylamino)silane, tetrakis(dipropylamino)silane, tetrakis(dibutylamino)silane, tetrakis(dipentylamino)silane, tetrakis(dihexylamino)silane, the corresponding tris- and bis(dialkylamino)silanes, and mixtures thereof. The preferred compound is tetrakis(dimethylamino)silane. The amount of polysilazane and/or (dialkylamino)silane used is preferably about 20-30% of the combined weights of ingredients A-E.

(D) The cyclopentadienyl Group IVa metal halide optionally employed is a compound corresponding to the formula $(C_5H_5)_nMH_mX_p$ wherein M is a Group IVa metal, i.e., titanium. zirconium, or hafnium; X is halo, i.e., fluoro, chloro, bromo, or iodo; m is 0, 1, or 2; p and n are integers of 1-3; and the sum of m, n, and p is 4. Exemplary of such compounds are cyclopentadienylhafnium trichloride, bis(cyclopentaidenyl)hafnium dichloride, tris(cyclopentadienyl)hafnium chloride, cyclopentadienylhafnium chloride dihydride, bis(cyclopentadienyl)hafnium chloride hydride, the corresponding zirconium and titanium compounds, the corresponding fluorides, bromides, and iodides, and mixtures thereof. The preferred compound is bis(cyclopentadienyl)zirconium dichloride. When employed, this ingredient generally constitutes not more than about 5% of the combined weights of ingredients A-E.

In the preparation of the multilayer coatings just described, the layers derived from the buffer and polysilazane compositions may be obtained by applying and treating the compositions in essentially the same manner as the organoborosilazane polymer compositions. However, it is sometimes preferred to apply the buffer composition in a thinner layer, e.g., a layer having a thickness of about 0.5-5 micrometers; and it is apt to be found desirable to use even higher temperatures, e.g., about 1300°-1350° C., for the final heat treatment after pyrolysis in the preparation of ceramic layers from polysilazane compositions.

As already indicated, the organoborosilazane polymer coatings of the invention are useful in sealing silicon carbide coatings on carbonaceous substrates and in increasing the resistance of the coated substrates to oxidative deterioration at elevated temperatures. This advantage is of particular importance in the protection of carbon/carbon composites and graphite used in aerospace applications, such as engine components, advanced nozzle system components, and high-temperature vehicle structures.

The following examples are given to illustrate the invention and are not intended as a limitation thereof.

EXAMPLE I

Synthesis of Polysilazane

Part A

A suitable reaction vessel was charged with 14L of anhydrous tetrahydrofuran and cooled to about 0° C., after which 1545 g (13.43 mols) of methyldichlorosilane was added to the vessel, and stirring at about 60 rpm was begun. A slow steady stream of 1058 g (62.12 mols) of anhydrous ammonia gas was introduced into the vessel at a flow rate such that the reaction pressure was maintained at or below 400 kPa, and the reaction temperature stayed in the range of 0°-10° C. Then the reaction mixture was stirred at 0° C. for about three hours, after which the coolant flow on the vessel was shut off, and the system was put under gentle nitrogen purge to allow the reaction mass to warm to room temperature and the majority of the excess ammonia to vent off. Then the reaction vessel was pressurized with sufficient nitrogen gas to pump the product mass through a bag filter assembly into a holding tank, where it was verified that the filtrate solution was free of particulates.

Part B

The clear filtrate from Part A was discharged into a polymerization vessel and chilled to about 0° C., and a suspension of 3.6 g (0.089 mol) of potassium hydride powder in about 100 mL of anhydrous tetrahydrofuran was added to begin the polymerization reaction. The reaction mixture was maintained at 0° C. for about 8 hours and then allowed to warm gradually to about 22° C. After a total of about 26 hours of polymerization at 0°-22° C., the reaction was quenched by adding about 12.6 g (0.13 mol) of dimethylchlorosilane to the polymerization solution.

The polymer product was isolated by (1) concentrating the product solution to about 4L of volume by vacuum distillation, (2) centrifuging the concentrated solution to obtain a clear supernatant solution and a white precipitate, (3) decanting off the supernatant solution from the precipitate, and (4) flashing off the volatiles from the supernatant solution by vacuum distillation to provide a white solid. Proton NMR spectra of the polymer in deuterated chloroform solvent had resonances consistent with those reported in Seyferth et al.-II for polysilazane and with the presence of a small amount, i.e., 2.4% by weight, of residual tetrahydrofuran.

EXAMPLE II

Synthesis of Organoborosilazane Polymer

A 93.9% solution of four parts of trimethoxyboroxine in 1-methyl-2-pyrrolidone was slowly added with stirring to a 25% solution of one part of the polysilazane of Example I and 0.09 part of dimethylchlorosilane in a 50/50 mixture of xylene and 1-methyl-2-pyrrolidone. An exothermic reaction occurred to form a solution of an organoborosilane polymer which was diluted with an additional 0.07 part of 1-methyl-2-pyrrolidone.

EXAMPLE III

Preparation of Dispersions

Part A

One part of amorphous silicon metal, one part of silicon tetraboride, and 0.5 part of silicon hexaboride were dispersed in a xylene solution of 100 parts of the polysilazane of Example I to form Dispersion A.

Part B

One part of amorphous silicon metal, one part of silicon hexaboride, and 0.2 part of barium fluoride were dispersed in an amount of the organoborosilazane polymer product solution of Example II prepared from 100 parts of the polysilazane to form Dispersion B.

EXAMPLE IV

Preparation of Buffer Layer Composition

A buffer composition was prepared by (1) dissolving 25 parts of zirconium propoxide, 25 parts of aluminum sec-butoxide, and 12.5 parts of tetrakis(diethylamino)-titanium in 62.5 parts of a 40% solution of the polysilazane of Example I in xylene and (2) dispersing a 3/1 mixture of amorphous silicon metal powder and silicon tetraboride powder in the resultant solution in an amount such as to provide a dispersion having a dispersed solids content of 20-25%.

EXAMPLE V

Silicon carbide-coated carbon/carbon composite coupons were thoroughly swab-coated with the organoborosilazane polymer solution of Example II, dried, heated at 825°-875° C. to pyrolyze the coating to form a ceramic, cooled at a rate of about 20°-30° C./minute until the substrate temperature was below 500° C., and then allowed to cool to room temperature under ambient air conditions. After the coated coupons had been cooled, they were provided with three additional ceramic coats in essentially the same manner to provide coupons having a coating thickness of about 0.08-0.1 mm.

The effectiveness of the ceramic coats thus obtained in protecting the substrates from oxidation was determined by an oxidation test. The coated specimen was mounted horizontally in a half section of a silicon carbide tube which was used as a holder and which allowed over 99% of the coupon surface to be directly exposed to hot ambient convecting air. The holder and specimen were placed in a box furnace which had been preheated to about 650° C. and held there for 24 hours, after which the holder and specimen were removed from the furnace and quenched in ambient air, and the cooled specimen was weighed. The weight loss on oxidation was determined to be only 0.93% after 24 hours. This compares with an oxidation weight loss of 100% after 24 hours when carbon/carbon composite coupons having no overcoating were subjected to the same oxidation test.

EXAMPLE VI

Siliconized silicon carbide-coated carbon/carbon composite coupons were primed with a primer composition obtained by mixing 3-5 cc of a 1.9M solution of HF in ethanol, 3 cc of xylene, and 3 cc of isopropanol with 100 g of trimethoxyboroxine. The primer was solidified, and the primed surfaces were then successively coated with (1) the organoborosilazane polymer solution of Example II and (2) Dispersion B, each of which was applied, dried, and pyrolyzed in multiple layers as previously described.

After Dispersion B had been dried and pyrolyzed, it was overcoated with the buffer composition of Example IV, which was then dried and successively overcoated with (1) a solution of the polysilazane of Example I, (2) Dispersion A, and (3) another layer of a solution of the polysilazane of Example I, each of which coating layers was dried and pyrolyzed before the application of the next layer, to complete the formation of a multilayer coating on the coupons. The layers applied over the buffer layer had good adherence to the lower layers and had few-to-no cracks.

The effectiveness of the coating in protecting the substrate from oxidative deterioration at elevated temperatures and deterioration by exposure to moisture was determined by subjecting the coated coupons to a stringent thermal cycle of 24 minutes at about 1426° C., four hours at about 815° C., and 18 hours at about 648° C., then placing them in a humidity chamber maintained at 98% relative humidity at a temperature of 40° C. for 24 hours, and then repeating the thermal cycle. The weight loss determined at the end of the test was only 4.36%.

EXAMPLE VII

Example VI was essentially repeated except that the coupons that were coated by the process were diffusion bonded silicon carbide-coated carbon/carbon composite coupons. The weight loss determined at the end of the test was only 3.51%.

It is obvious that many variations may be made in the products and processes set forth above without departing from the spirit and scope of this invention.

What is claimed is:

1. An article comprising (1) a silicon carbide-coated carbonaceous substrate which is normally susceptible to oxidative deterioration and (2) a ceramic topcoat derived by the application, drying, and pyrolysis of an organoborosilazane polymer solution containing 0-60% by weight of dispersed ceramic or preceramic powdered solids; said polymer being the product obtained by reacting about 0.25-20 parts by weight of a trialkoxy-, triaryloxy-, or tri(arylalkoxy)boroxine with one part by weight of a polysilazane in an organic solvent.

2. The article of claim 1 wherein the carbonaceous substrate is a carbon-carbon composite.

3. The article of claim 1 wherein the organoborosilazane polymer is the product obtained by reacting about 1-6 parts by weight of a trialkoxyboroxine with one part by weight of a polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent.

4. The article of claim 3 wherein the organoborosilazane polymer is the product obtained by reacting about 3-4 parts by weight of trimethoxyboroxine with one part by weight of a polysilazane prepared by reacting methyldichlorosilane with ammonia, treating the ammonolysis product with potassium hydride, and quenching the resultant product with an electrophilic quenching reagent.

5. The article of claim 1 comprising:
(A) a silicon carbide-coated carbonaceous substrate that is normally susceptible to oxidative deterioration,
(B) at least one ceramic coating layer derived by (1) coating the silicon-carbide-coated carbonaceous substrate with a solution of 5-75% by weight of an organoborosilazane polymer in 95-25% by weight of an organic solvent and (2) drying and pyrolyzing the organoborosilazane polymer coating,
(C) at least one ceramic overcoat derived by (1) overcoating the thus-coated substrate with a dispersion of about 0-1.0 part by weight of a Group IIa metal salt and about 0.1-5.0 parts by weight of ceramic or preceramic powdered solids in a solution of about 1.25-20 parts by weight of an organoborosilazane polymer in about 0.5-400 parts by weight of an organic solvent and (2) drying and pyrolyzing the coating, (D) at least one ceramic overcoat derived by (1) overcoating the thus-coated substrate with a buffer composition which is a dispersion of about 1–35% by weight of ceramic or preceramic powdered solids in a solution of (a) a Group IIIb metal hydrocarbyloxide, (b) a Group IVa metal hydrocarbyloxide, (c) a bis-, tris-, or tetrakis(dialkylamino)-metal of Group IVa, (d) a polysilazane and/or a bis-, tris-, or tetrakis(dialkylamino)silane, and (e) optionally a cyclopentadienyl Group IVa metal halide in an organic solvent; each of ingredients a–d constituting 1–50% of their combined weights, and ingredient e constituting 0–20% of the combined weights of ingredients a–e, (2) overcoating the buffer composition with a solution of 5–75% by weight of a polysilazane in 95–25% by weight of an organic solvent, and (3) drying the pyrolyzing the buffer and polysilazane compositions separately or simultaneously, (E) at least one ceramic overcoat derived by (1) overcoating the thus-coated substrate with a dispersion of about 0.1–5.0 parts by weight of ceramic or preceramic powdered solids in a solution of one part by weight of a polysilazane in about 1.3–20 parts by weight of an organic solvent and (2) drying and pyrolyzing the coating, and (F) optionally (1) an overcoat derived by (a) overcoating the thus-coated substrate with the buffer composition of (D) and (b) drying and optionally pyrolyzing the coating and/or (2) at least one ceramic overcoat derived by (a) overcoating the thus-coated substrate with a solution of 5–75% by weight of a polysilazane in 95–25% by weight of an organic solvent and (b) drying and pyrolyzing the coating.

6. A process which comprises (1) overcoating a silicon carbide-coated carbonaceous substrate with an organoborosilazane polymer solution containing 0–60% by weight of dispersed ceramic or preceramic powdered solids, said polymer being the product obtained by reacting about 0.25–20 parts by weight of a trialkoxy-, triaryloxy-, or tri(arylalkoxy)boroxine with one part by weight of a polysilazane in an organic solvent, (2) drying the coating, and (3) pyrolyzing the polymer at a temperature of about 675° C.–900° C.

7. The process of claim 6 wherein the organoborosilazane polymer is the product obtained by reacting about 3–4 parts by weight of trimethoxyboroxine with one part by weight of a polysilazane prepared by reacting methyldichlorosilane with ammonia, treating the ammonolysis product with potassium hydride, and quenching the resultant product with an electrophilic quenching reagent.

* * * * *